United States Patent [19]
Clark et al.

[11] Patent Number: 5,890,846
[45] Date of Patent: Apr. 6, 1999

[54] CUTTING TOOL FOR TOOTHED ARTICLES

[75] Inventors: Raymond E. Clark, Mt. Morris; Hermann J. Stadtfeld; Lyndon D. Stickles, both of Rochester, all of N.Y.

[73] Assignee: The Gleason Works, Rochester, N.Y.

[21] Appl. No.: 823,098

[22] Filed: Mar. 24, 1997

Related U.S. Application Data

[60] Provisional application No. 60/016,155, Apr. 25, 1996.

[51] Int. Cl. [6] .................................................. B26D 1/12
[52] U.S. Cl. .............................. 407/21; 407/35; 407/52
[58] Field of Search .................................. 407/20, 27, 29, 407/21, 33, 35, 34, 51, 56, 61, 42, 43; 409/25, 234

[56] References Cited

U.S. PATENT DOCUMENTS

| | | |
|---|---|---|
| 1,914,411 | 6/1933 | Earl . |
| 1,927,409 | 9/1933 | Markstrum ................................. 407/35 |
| 2,033,384 | 3/1936 | Marshall . |
| 3,090,104 | 5/1963 | Nokov . |
| 3,384,945 | 5/1968 | Kujawiak et al. . |
| 3,531,842 | 10/1970 | Bowling . |
| 3,548,473 | 12/1970 | Stein . |
| 3,571,876 | 3/1971 | Blakesley .................................. 29/105 |
| 3,760,476 | 9/1973 | Kotthaus . |
| 4,093,391 | 6/1978 | Bachmann et al. . |
| 4,197,038 | 4/1980 | Hipp et al. . |
| 4,522,538 | 6/1985 | Lindsay ..................................... 407/35 |
| 4,575,285 | 3/1986 | Blakesley . |
| 4,621,954 | 11/1986 | Kitchen et al. ........................... 407/22 |
| 5,477,755 | 12/1995 | Blakesley et al. ........................ 407/22 |

*Primary Examiner*—Andrea L. Pitts
*Assistant Examiner*—Mark Williams
*Attorney, Agent, or Firm*—Robert L. McDowell

[57] ABSTRACT

A cutter head including a cutter body portion having a first outer surface and a second outer surface located inward of the first outer surface. Both first and second outer surfaces are interrupted by a plurality of blade receiving slots which extend inward into the cutter body portion. The first and second outer surfaces are arranged such that an annular projection is formed protruding from the second outer surface and extending to the first outer surface. The annular projection is also interrupted by the plurality of cutting blade slots thus forming a plurality of individual projections. The cutter head additionally includes a clamping ring extending about the cutter body and secured to the annular projection. The clamping ring comprises first and second ring members which together define an inner receiving channel having a form complementary with the form of the annular projection whereby securing the first and second ring members together about the annular projection positions the annular projection in the receiving channel and secures the clamping ring to the cutter body. The cutter head may include a generally concave shaped clamping block which is attached to the receiving channel in the clamping ring. The cutter head may further comprise blade receiving slots wherein the inner end portion of the slots includes a pair of angled blade mounting surfaces. Also included are cutting blades having side portions of a form which is complementary to the angled blade mounting surfaces of the cutter head.

18 Claims, 12 Drawing Sheets

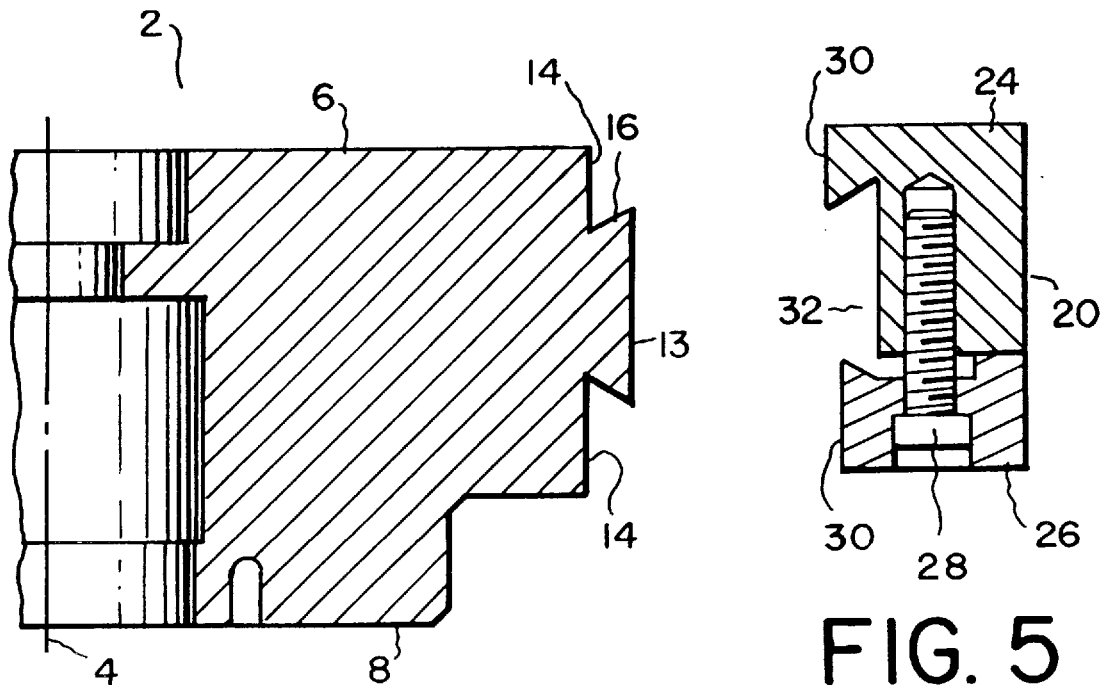
FIG. 4
FIG. 5
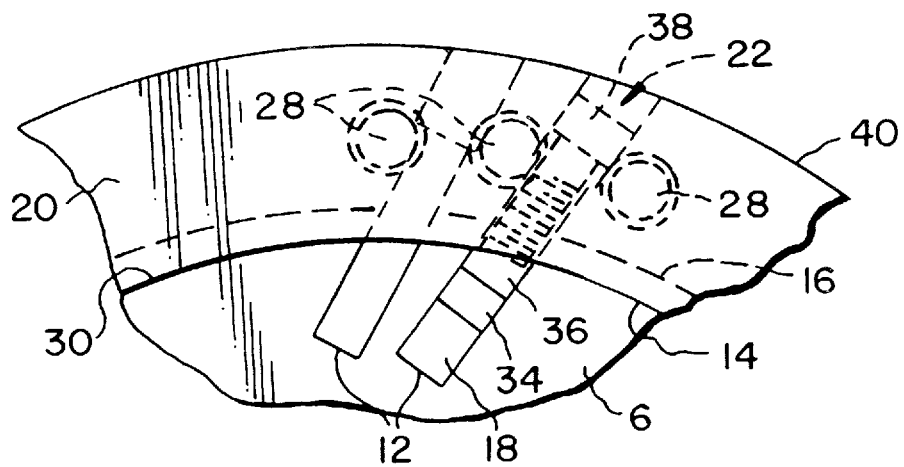
FIG. 7

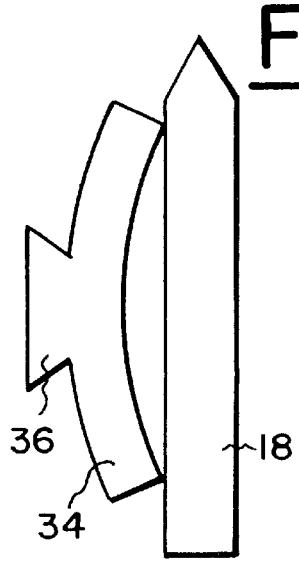
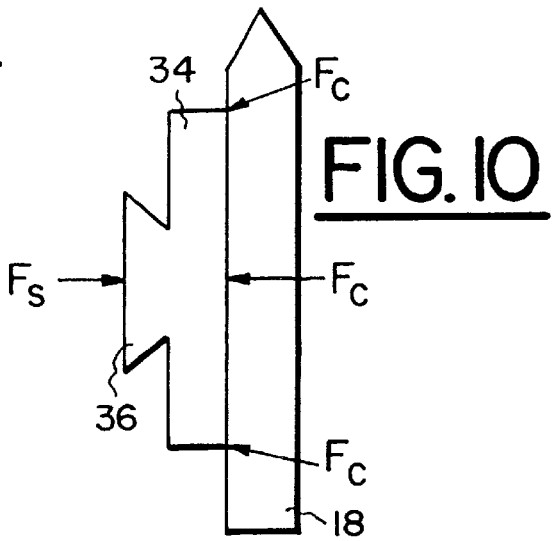
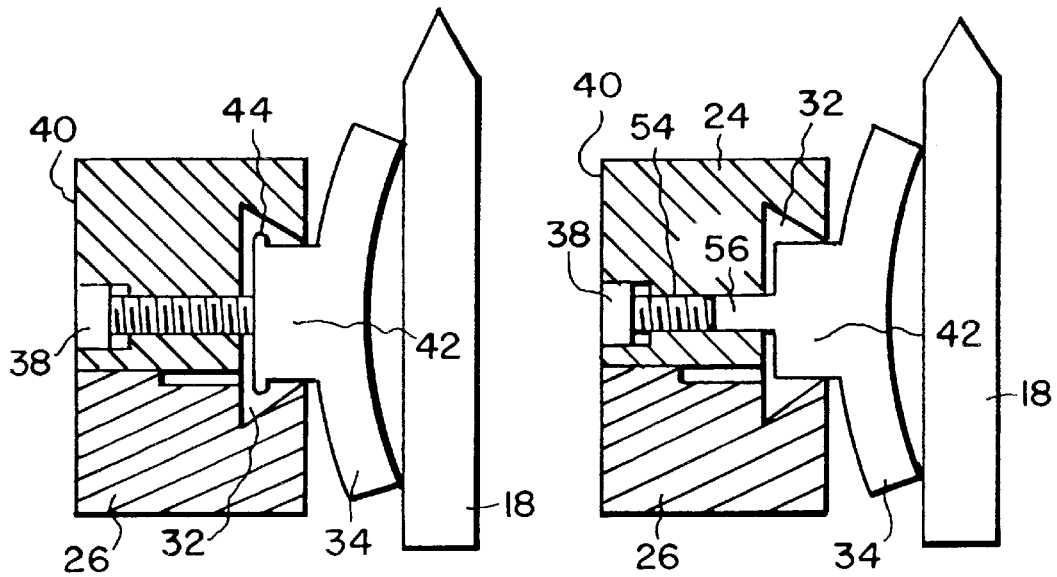
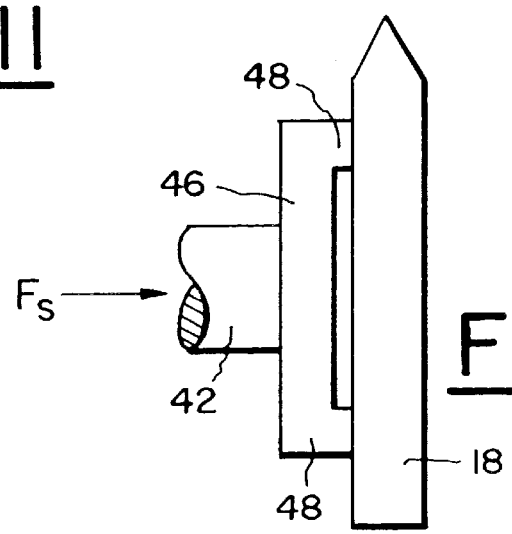

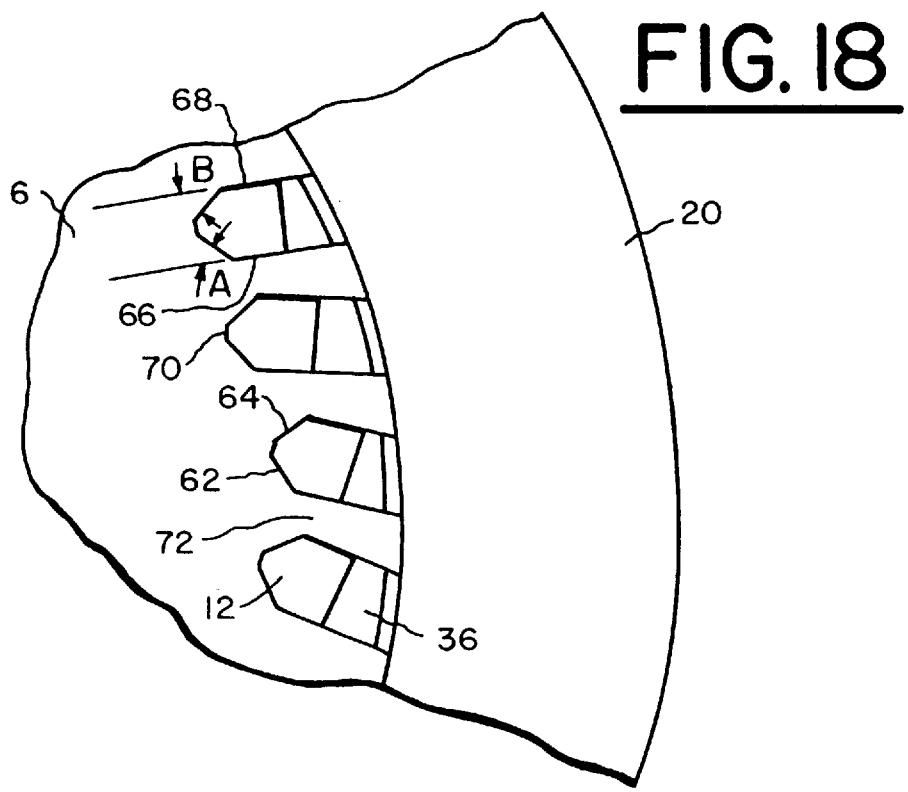
FIG. 18
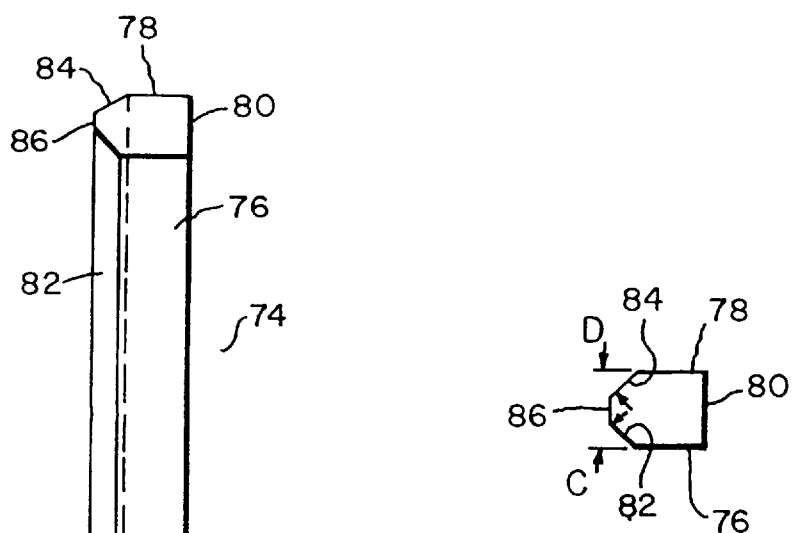
FIG. 19
FIG. 20

FIG. 21
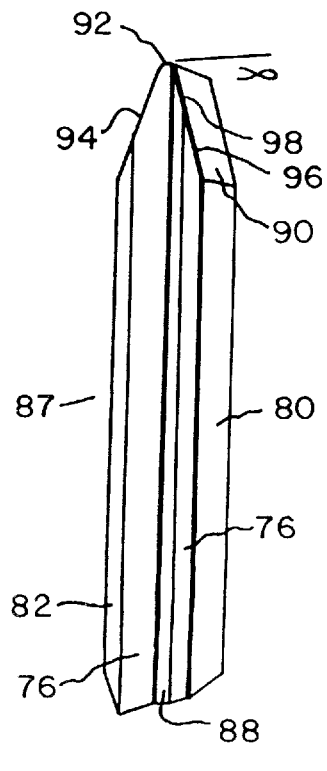
FIG. 23
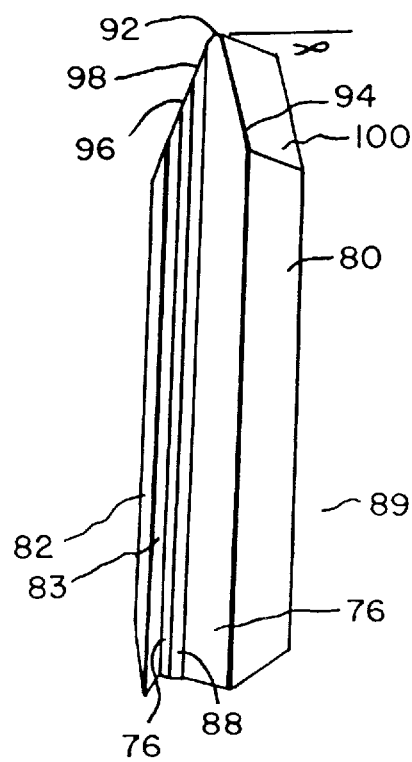
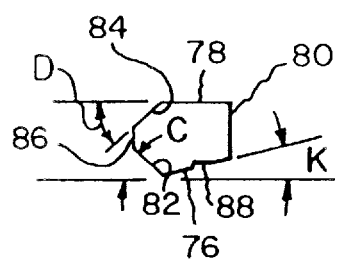
FIG. 22
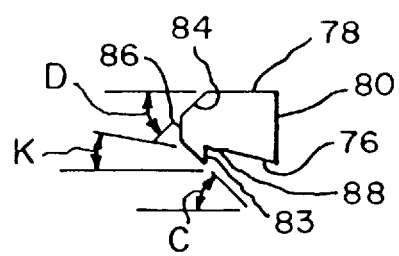
FIG. 24

CUTTING TOOL FOR TOOTHED ARTICLES

FIELD OF THE INVENTION

This application claims priority under 35 USC 119(e) on provisional application number 60/016,155, filed Apr. 25, 1996.

The present invention is generally directed to cutting tools for toothed articles such as gears and the like. Particularly, the present invention is directed to cutter head components and blade clamping and positioning means to improve the machining accuracy of the cutting tool.

BACKGROUND OF THE INVENTION

It is known in the art to produce toothed articles, such as bevel and hypoid gears, with cutting tools comprising a head portion in which a plurality of cutting blades are positioned, for example, stick-type cutting blades manufactured from bar stock such as shown in U.S. Pat. No. 4,575,285 to Blakesley.

In the type of cutting tool mentioned above, it is customary to provide a circular cutter body having a plurality of slots extending inwardly a predetermined distance from the periphery of the cutter body for receiving and positioning cutting blades in the cutter body. In many instances, extending about the periphery of the cutter body is a clamping ring (or locking ring) which is secured to the cutter body and in which is mounted means to clamp one or more cutting blades in each of the positioning slots. Cutting tools including a clamping ring and blade clamping means can be seen, for example, in U.S. Pat. Nos. 4,621,954 to Kitchen et al.; 3,760,476 to Kotthaus; 4,093,391 to Bachmann et al.; or 4,197,038 to Hipp et al.

The clamping ring is secured to the cutter body in many instances by welding or heat shrinking. Although these methods represent a very secure manner by which to attach the clamping ring to the cutter body, they also introduce significant heat into the cutter head which can distort the cutting blade positioning slots or warp the cutter head, thus introducing dimensional inaccuracies such as runout into the workpiece being machined.

Unacceptable workpiece quality may also be caused by inadequate clamping of the cutting blades in the cutter head. Cutting blades that are not securely clamped will lose their precise positioning in the cutter head thereby contributing to workpiece runout as well as poor surface quality of the tooth flanks. Some clamping arrangements provide for only a single source of clamping force applied to a cutting blade which affords the opportunity for movement of the cutting blade under cutting loads. Other clamping arrangements, while providing more stable clamping systems, are quite awkward due to the presence of multiple clamping screws or a large number of components. Still other clamping systems make no provisions for retaining the clamping mechanism in the cutter head blade slot when no blade is present.

It is, therefore, an object of the present invention to provide a clamping ring which can be secured to a cutter body while avoiding the detrimental effects due to heating of the cutter head.

It is an additional object of the present invention to provide a cutting blade clamping system which more securely holds a cutting blade in its proper position in a cutter head.

Another object of the present invention is to include precise mounting surfaces in a cutter head that provide improved seating of a cutting blade in the positioning slots of the cutter head.

SUMMARY OF THE INVENTION

The invention is directed to a cutting tool for cutting toothed articles. The cutting tool is rotatable about an axis of rotation and comprises a generally circular cutter head and a plurality of cutting blades projecting from a face of the cutter head. The cutter head includes a cutter body portion having a first outer surface and a second outer surface located inward of the first outer surface. Thus, the first and second outer surfaces can be described as coaxial annular surfaces. Both first and second outer surfaces are interrupted by a plurality of blade receiving slots which extend inward into the cutter body portion. The first and second outer surfaces are arranged such that an annular projection is formed protruding from the second outer surface and extending to the first outer surface. The annular projection is also interrupted by the plurality of cutting blade slots. Thus, in effect, the annular projection is made up of a plurality of individual projections.

The inventive cutter head additionally includes a clamping ring extending about the periphery of the cutter body and secured to the annular projection. The clamping ring comprises an inner wall positioned adjacent the second outer surface of the cutter body with the clamping ring having first and second ring members secured together by a plurality of securing means. The first and second ring members together define a receiving channel in the inner wall with the receiving channel having a form complementary with the form of the annular projection whereby securing the first and second ring members together about the annular projection positions the annular projection in the receiving channel and secures the clamping ring to the cutter body.

The cutter head may also include a generally concave shaped clamping block which is attached to the receiving channel in the cutter ring.

The cutter head may further comprise blade receiving slots wherein the inner end portion of the slots include a pair of angled blade mounting surfaces.

The present invention also includes cutting blades having a side portion of a form which is complementary to the inner end, angled blade mounting surfaces of the cutter head.

BRIEF DESCRIPTION OF THE DRAWINGS

FIGS. 4 and 5 show the cutter head of FIG. 1 with the cutter body separated from the clamping ring.

FIG. 7 illustrates a partial top view of the inventive cutter head.

FIG. 9 illustrates the clamp block of the present invention in the unclamped condition adjacent a cutting blade.

FIG. 10 illustrates the clamp block of the present invention in the clamped condition against a cutting blade.

FIG. 11 shows an alternative arrangement for attaching the clamp block to the cutter head.

FIG. 12 shows an additional arrangement for attaching the clamp block to the cutter head.

FIG. 13 illustrates an alternative embodiment of the clamping means.

FIG. 18 illustrates an enlarged sectional top view of the blade receiving slots of the cutter head shown in FIG. 17.

FIG. 19 illustrates a elevated front view of a cutting blade blank having a side portion comprising angled mounting surfaces.

FIG. 20 represents a cross-sectional view of the cutting blade blank of FIG. 19.

FIG. 21 illustrates a perspective view of an inside cutting blade having a side portion comprising angled mounting surfaces.

FIG. 22 shows a cross-sectional view of the cutting blade of FIG. 21.

FIG. 23 illustrates a perspective view of an outside cutting blade having a side portion comprising angled mounting surfaces.

FIG. 24 shows a cross-sectional view of the cutting blade of FIG. 23.

DETAILED DESCRIPTION OF THE PREFERRED EMBODIMENT

The present invention will be discussed in detail with reference to the accompanying drawings.

Figure 1:
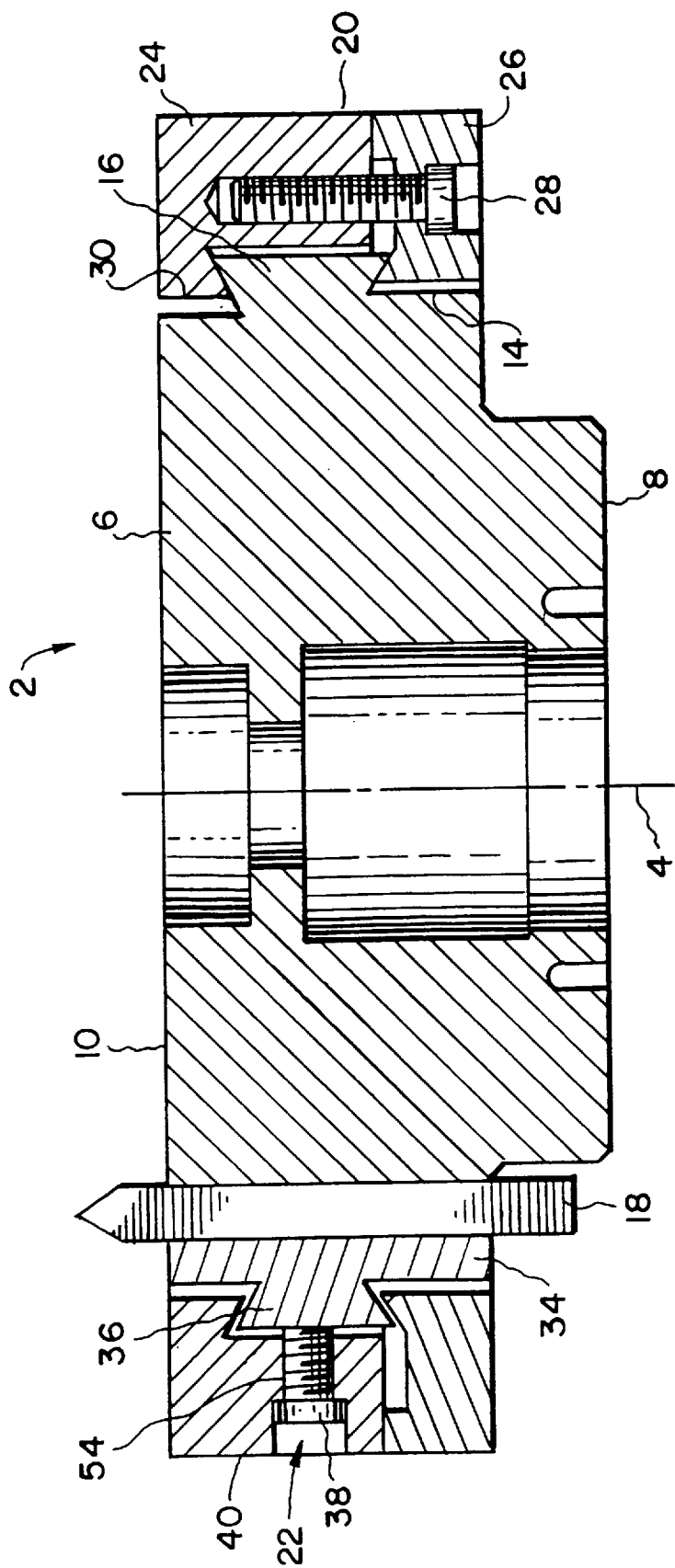
FIG. 1 represents a cross-sectional view of the present inventive cutter head and clamp block.

FIG. 1 illustrates a cross-sectional view of an inventive cutter head 2 which, when positioned on the spindle of a machine tool, is rotatable about an axis of rotation 4. The cutter head 2 comprises a cutter body 6 (see also FIGS. 2, 3 and 4) made of steel, such as 8620 for example, having a first end surface 8 and a second end surface 10. Cutter body 6 further includes a plurality of blade receiving and positioning slots 12 located about cutter body 6 and extending inward into the cutter body 6. The orientation of the positioning slots 12 is dependent upon the type of machining process and particular workpiece being machined as is well known to those of skill in the art.

Figure 2:
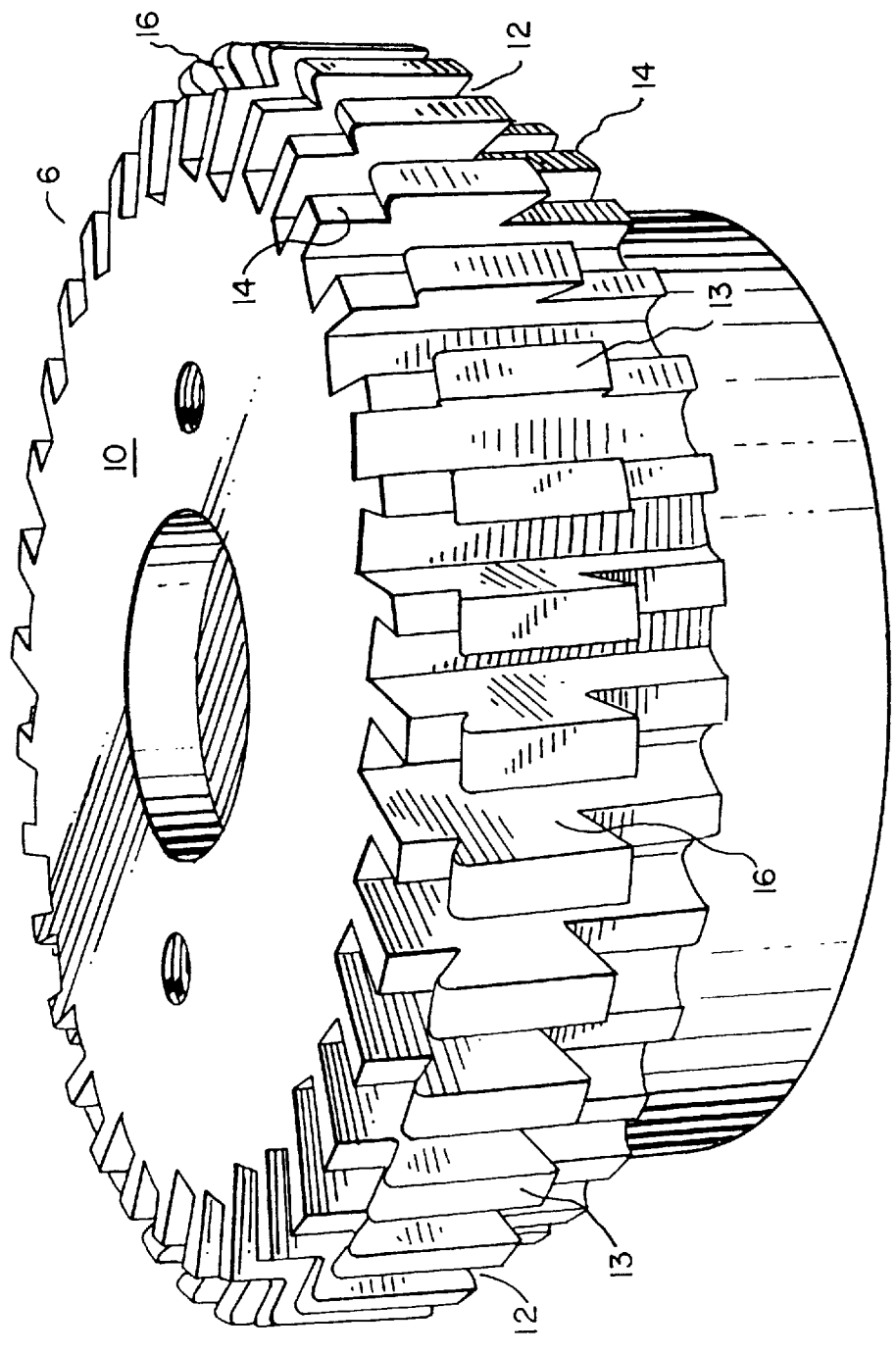
FIG. 2 is an elevated side view of the cutter body portion of the inventive cutter head.
Figure 3:
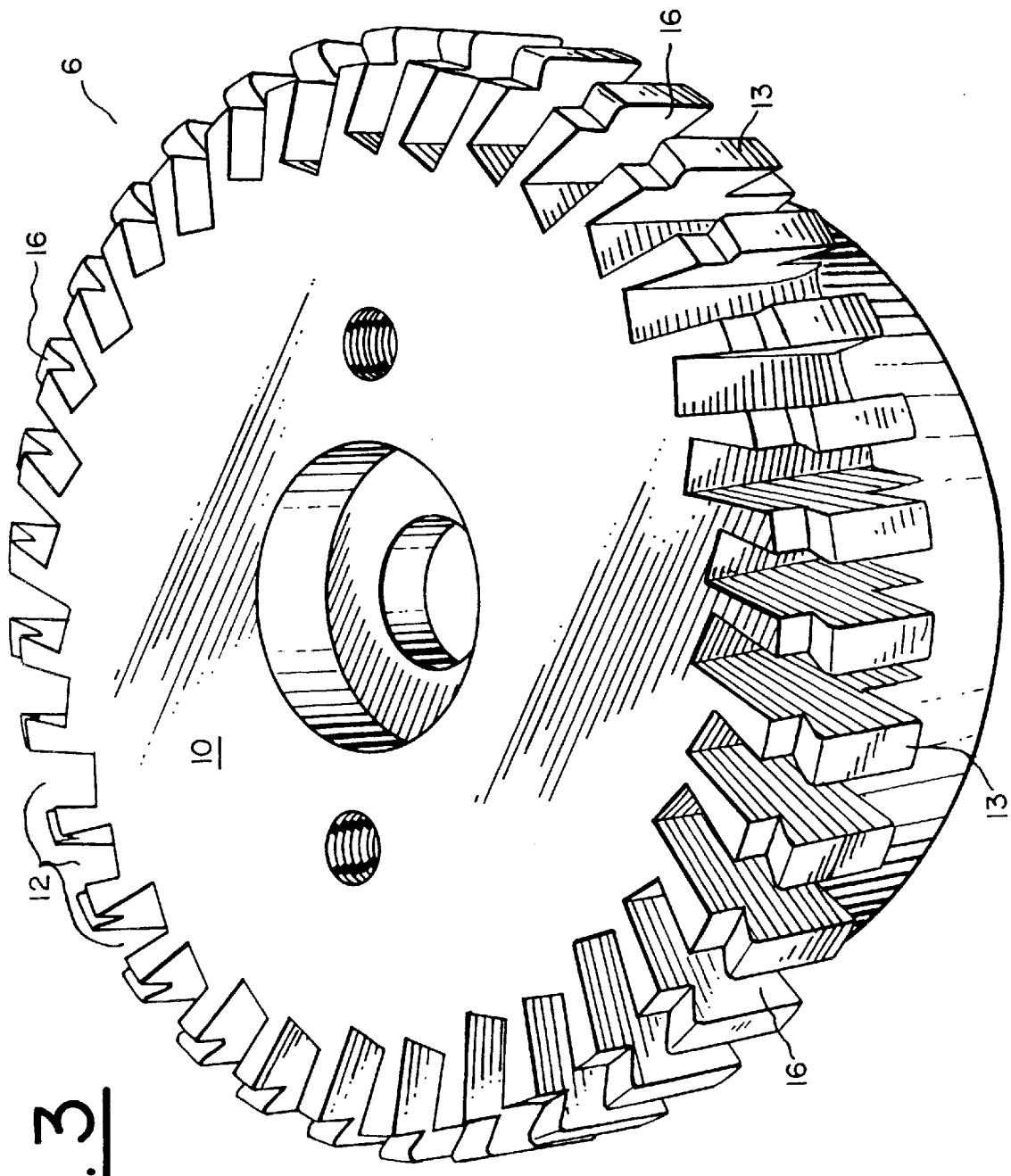
FIG. 3 is a top view of the cutter body portion of the inventive cutter head.

The cutter body 6 includes a first annular outer surface 13 (FIGS. 2–4) and a second annular outer surface 14 located inwardly of the first outer surface 13. Both surfaces 13, 14 are interrupted by the blade receiving slots 12. In FIGS. 1 and 4 it can be seen that in both directions along axis 4, second outer surface 14 extends beyond first outer annular surface 14 thereby forming an annular projection 16 of predetermined cross-sectional form protruding from the second annular surface 14. It follows that the annular projection 16 is also interrupted by the blade receiving slots 12. The annular projection 16 can thus be understood to comprises a plurality of individual projections (hereafter referred to as clamping projections) which, as shown in FIGS. 2, 3 and 4, preferably have a double dovetail form. The clamping projections 16 are formed by first forming a continuous double-dovetail projection about cutter body 6 which occurs as a result of machining the cutter head to produce first and second outer annular surfaces, 13 and 14. Individual clamping projections 16 are then formed as a result of the plurality of inwardly-extending blade receiving and positioning slots 12 being machined in the cutter body 6.

Figure 6:
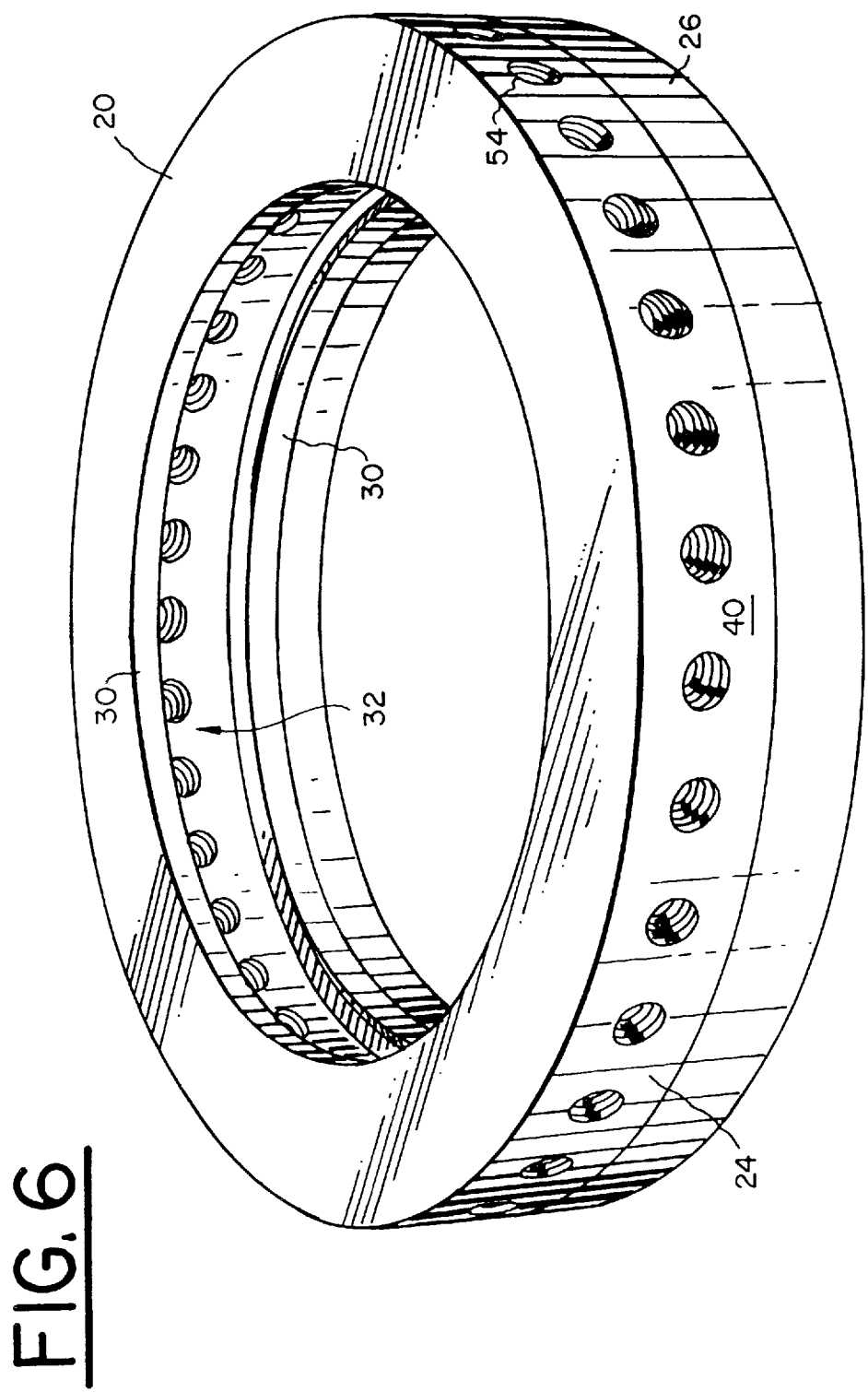
FIG. 6 illustrates an elevated side view of a clamping ring according to the present invention.

In order to position and clamp cutting blades 18 in blade positioning slots 12, a clamping ring 20 (see FIGS. 5 and 6 also) is provided about the cutter body 6. The clamping ring 20, made of 4150 SX steel for example, receives a number of blade clamping means 22 (equal to the number of blade positioning slots 12) attached thereto for clamping each cutting blade 18 in position in its respective slot 12. Clamping ring 20 comprises a first ring portion 24 and a second ring portion 26 secured to one another by screws 28. Preferably a plurality of screws are located equidistantly spaced around the clamping ring 20, and more preferably, screws 28 are arranged in an alternative manner with the clamping means 22 as can be seen in FIG. 7. The first ring portion 24 and second ring portion 26, when assembled to form the clamping ring 20 as seen in FIGS. 5 and 6, provide for an inner wall 30 in which is formed a receiving channel 32 extending around the inner wall 30 of the clamping ring 20 and which is complementary in shape to the annular projection 16.

Figure 8:
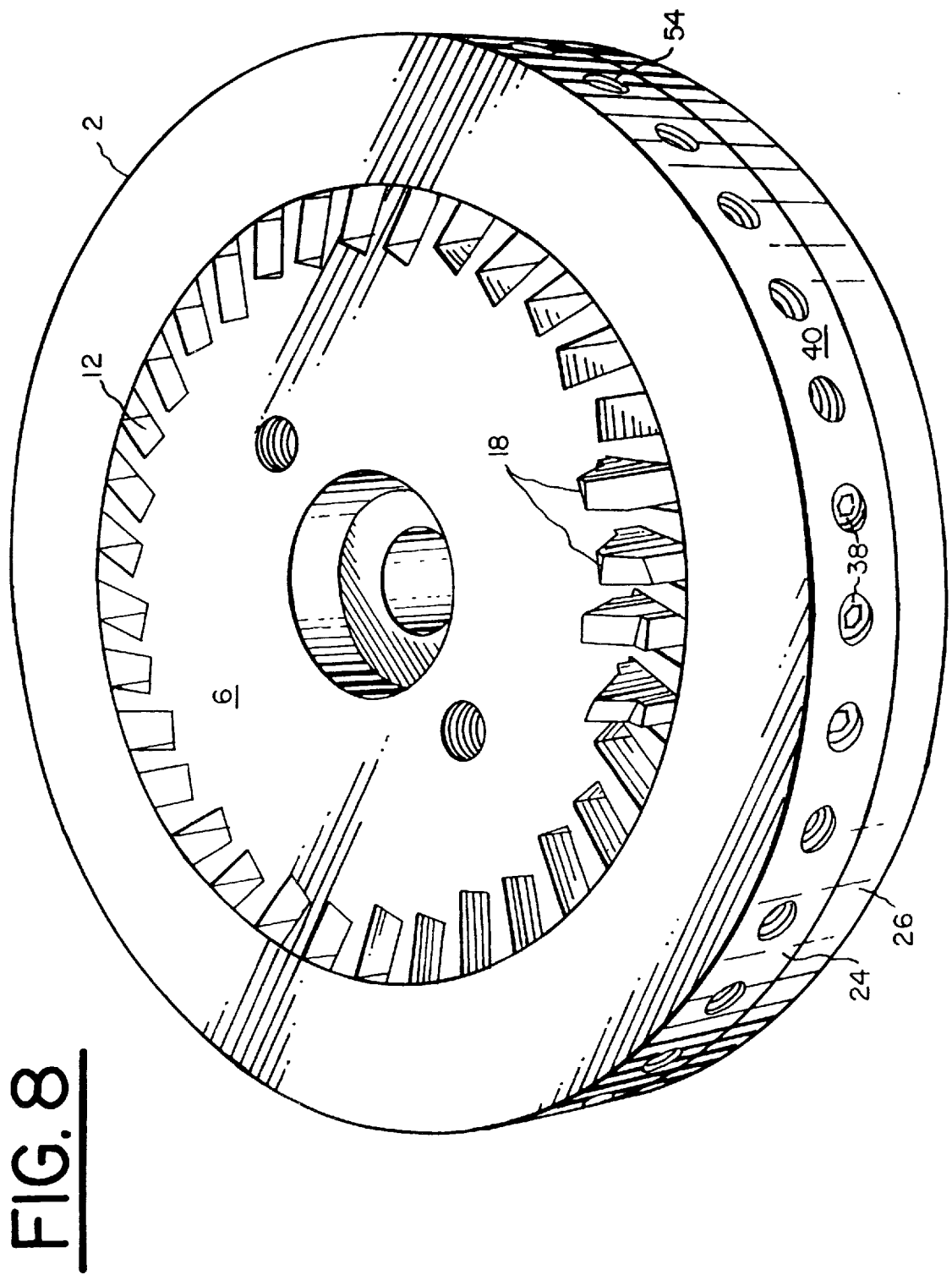
FIG. 8 shows an assembled cutter head including a plurality of cutting blades positioned therein.

Clamping means 22 (FIG. 1) comprises a clamping block 34 integral with an attachment means 36 and an urging means such as a screw 38. The screw 38 communicates with attachment means 36 via a threaded bore 54 in the first ring portion 24 and is accessible via an opening in the periphery 40 of clamping ring 20 for engagement with an appropriate tool (not shown) for turning the screw. Screw 38 is rotated to move inwardly thus urging the clamping block 34 into engagement with a cutting blade 18 thereby clamping the cutting blade 18 into position in the blade positioning slot 12. The form of the attachment means 36 may be complementary with the form of the receiving channel 32 such that, when the cutting tool is assembled, as seen in FIGS. 1 or 8, the attachment means 36 will fit inside the receiving channel 32 and will remain in the receiving channel even in the absence of a cutting blade 18 in the positioning slot 12 thus preventing the clamping block 34 from falling out of the cutter head 2 when a cutting blade is removed. The forms of the clamping block 34 and attachment means 36 will be discussed in more detail below.

In assembling the cutter head 2, the cutter body 6 is placed end-face-down into the first ring portion 24 to engage a portion of the clamping projections 16 with the complementary portion of the receiving channel 32 located in the first ring portion 24. The clamping block 34 with attachment means 36 is placed in the blade positioning slot 12 and the receiving channel 32 portion of the first ring portion 24. The second clamping ring portion 26 is then placed on the first ring portion 24 and screws 28 are inserted and tightened. In tightening screws 28, clamping ring portions 24 and 26 are drawn together, and with the complementary sloped surfaces of the receiving channel 32 and clamping projections 16, the clamping ring 20 is secured to the cutter body 6. The cutter head 2 may then be turned end-face-up and the cutting blades 18 are inserted into positioning slots 12 (see FIG. 8) and screws 38 are tightened to engage cutting blades 18 with clamping blocks 34 to clamp the cutting blades into position in the cutter head 2.

With the inventive arrangement, no external heat is applied to the cutter head 2 such as is found in the prior art where the clamping ring is secured to the cutter body by welding or heat shrinking. With no heat applied in assembly, warping of the cutter head and blade slot distortions are avoided thereby improving the precision of the cutting tool and hence, improving the quality of the workpiece machined by the cutting tool.

A preferred embodiment of the clamping block 34 is shown in FIG. 9 wherein the clamping block is shown in an unclamped position. It can be seen that the form of the clamping block is concave-shaped, preferably constructed from through-hardened spring steel. The advantage of this form is that when clamped against a cutting blade 18, as seen in FIG. 10, clamping forces ($F_c$) are exhibited not only in line with the force ($F_s$) of the clamping screw 38, but clamping forces are also present at the ends of the clamping block 34 due to the form of the clamping block 34 and the increased forces created at the ends of the clamping block 34 when it is elastically distorted from its original concave shape to its essentially flat form against the cutting blade 18. In addition to clamping forces $F_c$, frictional forces are also present between the end and center clamping forces which assist in securing the cutting blade in its position in the cutter head slot 12.

As an alternative to the complementary-shaped double-dovetail attachment means 36 shown in FIGS. 1 or 9, FIG. 11 illustrates an attachment means comprising a length of bar stock 42, preferably circular bar stock, with an enlarged end 44 (e.g. flared or flanged) which is contacted by screw 38 when clamping the cutting blade 18 with clamping block 34. The circular bar 42 may be attached to the clamping block 34 by any appropriate method such as friction welding. The end portion 44 is of a diameter larger than the opening height of receiving channel 32 and yet smaller than much of the varying inner height of receiving channel 32. In this manner, the end portion 44 may move radially within the receiving channel 12 as is necessary when screw 38 is turned inward to clamp a cutting blade in position. However, the diameter of the enlarged end 44 is large enough to prevent the end 44 from passing through the opening of the channel 32 when no blade is located in a positioning slot 12 and hence, prevents the clamping block 34 from falling out of a slot 12.

FIG. 12 represents another alternative attachment means wherein instead of an enlarged end 44 as seen in FIG. 11, the length of bar stock 42 is further lengthened to include a portion 56 inserted into the bore 54 extending between the receiving channel 32 and the periphery 40 of the clamping ring. The portion of the bore 54 into which the bar stock portion 56 extends need not be threaded. Turning the screw 38 to advance the screw inward exerts force on portion 56 which urges clamp block into engagement with cutting blade 18. When screw 38 is withdrawn in the bore 54, the spring action of clamp block 34 pushes the bar stock portion 56 into the bore 54 in a direction toward the periphery 40 of the clamping ring. Thus, when no cutting blade is present in a slot 12, the clamping block 34 will remain in the slot 12 since the portion 56 of the bar stock 42 will be located within bore 54.

FIG. 13 illustrates an alternative clamping block 46 having a generally concave shape, more precisely a bracket-like shape. With the clamping block 46 having projections 48 at each end thereof, clamping forces are concentrated at high and low locations on the cutting blade 18. In a manner similar to the clamping block of FIG. 10, providing clamping forces spaced apart on the cutting blade, instead of primarily in the middle of the blade as is known in some prior art clamping arrangements, enhances the positional stability of the cutting blade in the cutter head slot during machining.

Figure 14:
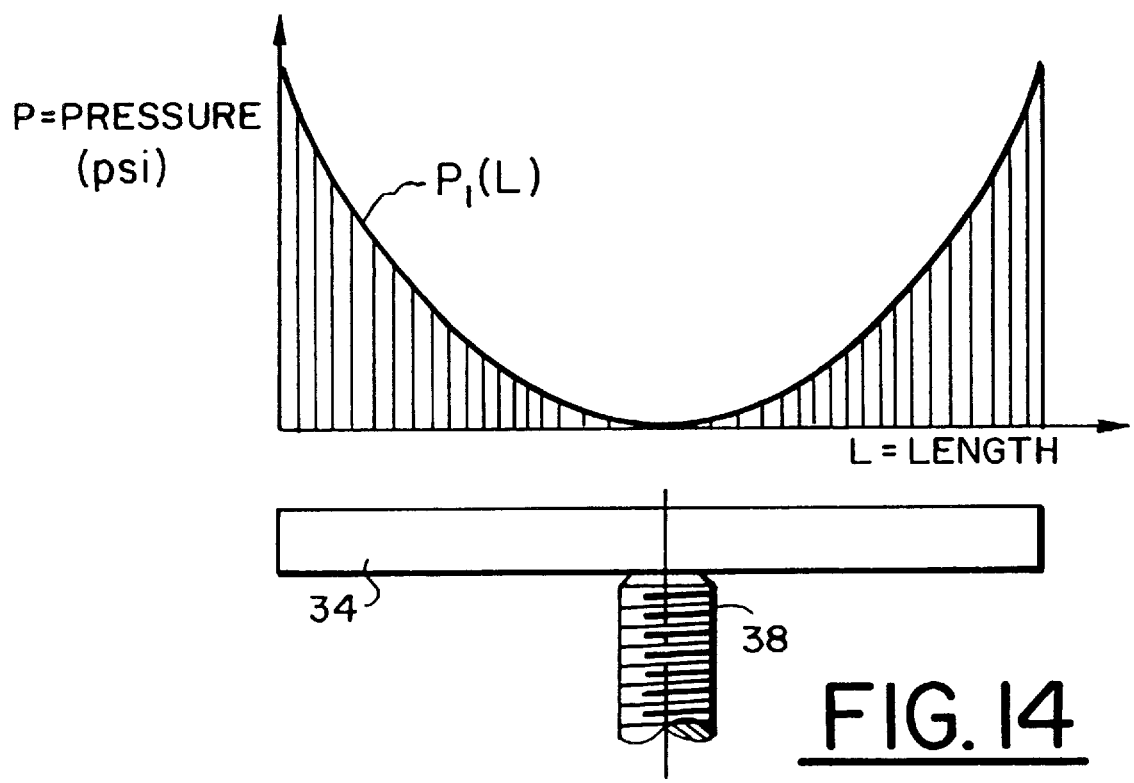
FIG. 14 illustrates the clamping pressure distribution along the length of a clamping block at the moment the clamping block is straightened against a cutting blade.
Figure 15:
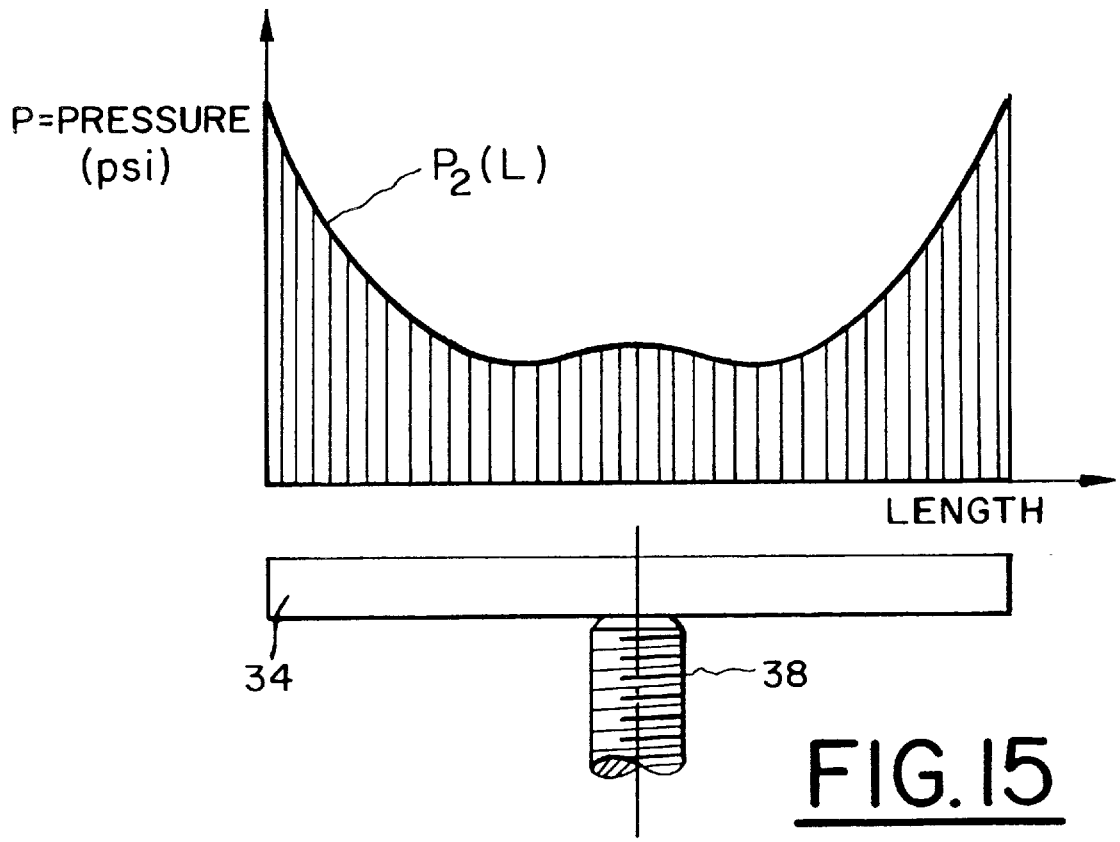
FIG. 15 illustrates the clamping pressure distribution along the length of a clamping block after the clamping block is straightened against a cutting blade and increased torque is required to further tighten a clamp screw.

The illustrated clamp blocks distribute the force from the clamping screw symmetrically to their ends. The maximum clamping pressure will exist on both ends. After the concave shape is straightened, an increase in torque occurs on the clamping screw. This can be sensed as a stop signal and therefore, a torque wrench is not necessary. FIG. 14 shows pressure distribution $P_1(L)$ over the length of clamp block 34 when positioned against a cutting blade at the moment the clamp block is straightened. As can be seen, maximum pressure exists at the ends of the clamping block 34. FIG. 15 illustrates the pressure distribution $P_2(L)$ over the length of clamp block 34 when positioned against a cutting blade at the moment the increase in torque of the clamping screw 38 is sensed. This condition was previously described and it is the optimal pressure distribution since not only do clamping forces exist at the ends of the clamping block 34 but also in the middle portion of the clamp block due to the increased torque of the clamping screw 38.

While the illustrated clamp blocks distribute clamping pressure equally between the ends of the clamp block, the present invention also includes arrangements where the clamp screw and/or attachment means is located asymmetrically along the length of the clamp block thus providing differing clamp pressures at the ends of the clamp block. This arrangement is beneficial when additional clamping pressure is desired near the cutting end of a cutting blade such as in those situations where a significant length of cutting blade extends beyond the face of the cutter head.

The concave clamp block controls the clamp force and pressure distribution between the clamp block the cutting blade. Primarily, the radius of curvature of the concave clamp block is the control parameter and this permits a "built-in" mechanism to control clamping pressure by varying the radius of curvature of the clamp block. By controlling the clamping force of the clamp block, an allowable maximum clamp force can be designed into the clamp block which, when exceeded, permits movement of the cutting blade in a cutter head slot, such as when cutting forces become greater than the maximum clamping force, thus preventing damage to a cutter.

Figure 16:
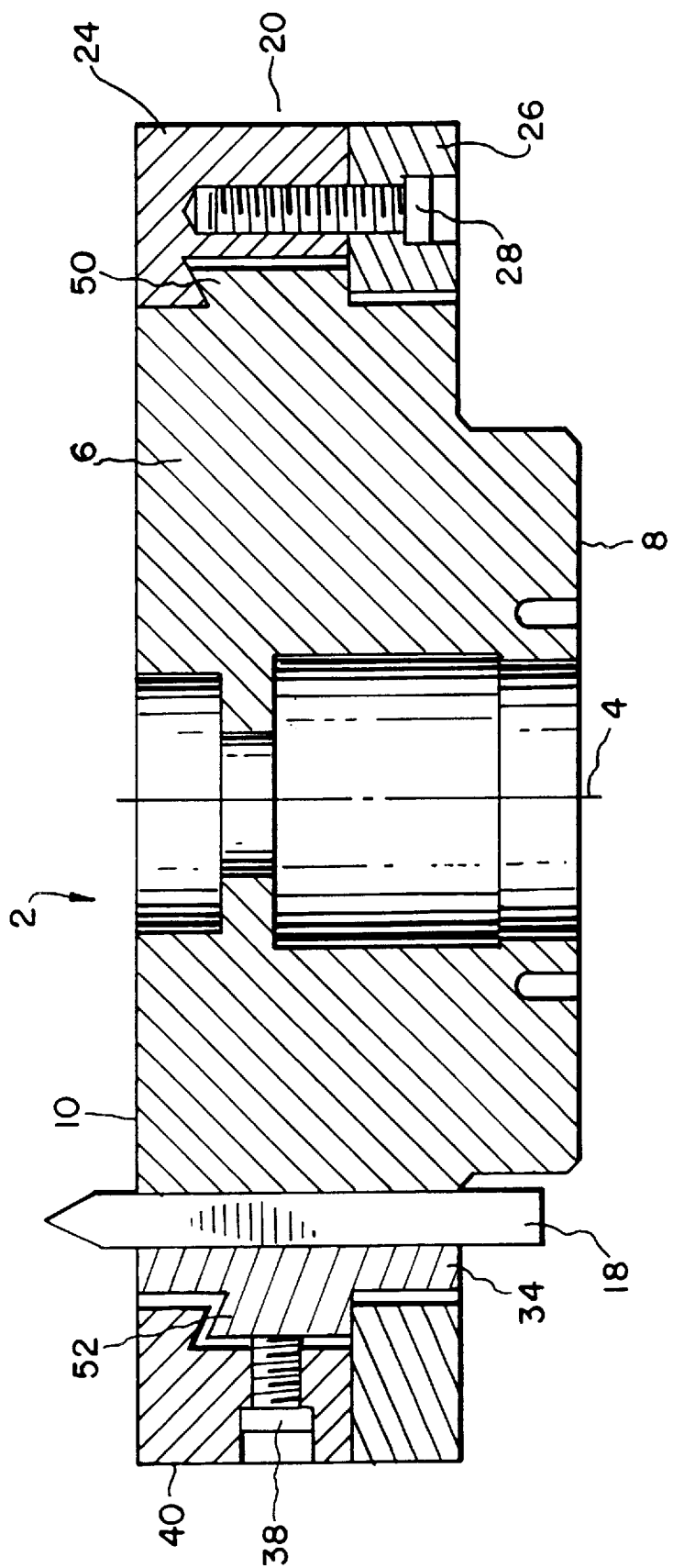
FIG. 16 represents an embodiment showing an alternative manner of securing the clamping ring to the cutter head.

An alternative embodiment to the double-dovetail clamping projections 16 and attachment means 36 of FIGS. 1 and 9 is shown in FIG. 16 wherein a single-dovetail clamping projection 50 and attachment means 52 are provided. Clamping ring 20 is correspondingly modified in this embodiment by replacing the sloped portion of second ring portion 26 with a planar surface to produce a receiving channel in the clamping ring 20 which is complementary with the shape of the clamping projection 50 and attachment means 52. Of course, while the single-dovetail arrangement is shown to be located in the first ring portion 24, alternatively, the single-dovetail arrangement may be formed in the second ring portion 26 with the planar surface located in the first ring portion 24.

With the present inventive cutter head, distortion of the blade positioning slots and warping of the cutter head due to heating during assembly are eliminated. The present invention also provides a clamping arrangement which improves the stability of the cutting blades in the positioning slots whereby the resulting machined workpiece exhibits enhanced surface quality and dimensional accuracy.

Figure 17:
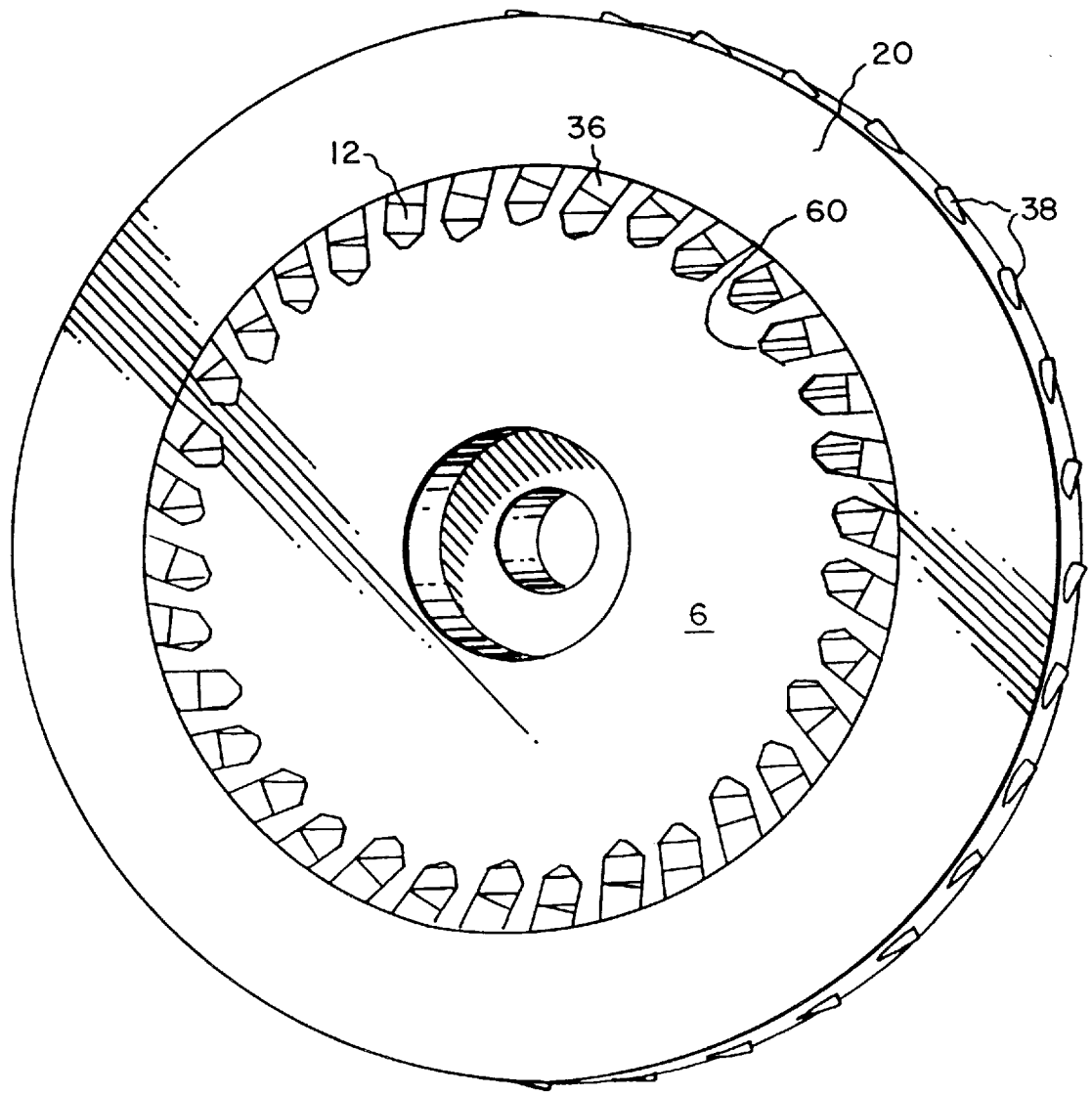
FIG. 17 shows a top view of alternative embodiment cutter head wherein the inner end portion of the blade receiving slots comprise a pair of angled blade mounting surfaces.

FIG. 17 and the enlarged sectional view of FIG. 18 illustrate a preferred embodiment of the present invention wherein the inner end portion 60 of each blade receiving slot 12 comprises a pair of angled blade mounting surfaces 62 and 64 such that the shape of the inner end portion 60 generally resembles that of a "V". First angled surface 62 is oriented at angle A with respect to the first side surface 66 of slot 12 while second angled surface 64 is oriented at angle B with respect to second side surface 68 of slot 12. Angles A and B may be the same or may differ from one another but each is less than 90 degrees. Preferably, angles A and B are each equal to 45 degrees. As can be seen in FIG. 18, the angled blade mounting surfaces 62, 64 extend toward one another in a converging manner and preferably intersect with and terminate at inner end surface 70. Usually, first and second slot surfaces 66 and 68 are parallel to one another and end surface 70 is perpendicular to the slot surfaces 66 and 68.

Angled blade mounting surfaces 62 and 64 provide a positive seating surface for cutting blades (described in detail below) and also result in a stronger cutter head. The strength of the cutter head is enhanced because the angled mounting surfaces 62, 64 allow additional material to remain between slots 12 of the cutter body 6 (i.e. in the web portion 72 as shown in FIG. 18). When compared with the cutter head in FIG. 8, the additional stock material between the slots is evident in the cutter head of FIG. 17. Furthermore, with angled blade mounting surfaces 62, 64, the sharpness of the corners at the inner ends of the slots 12, as noted in FIG. 8, is diminished thus reducing or abolishing areas of high stress concentrations due to cutting forces. If desired, the intersection of angled surfaces 62, 64 with their respective side surfaces 66, 68 and/or end surface 70 may be radiused to further reduce cutting-related stresses in the cutter head.

FIG. 19 and the cross-sectional view shown in FIG. 20 illustrate an inventive cutting blade blank 74 suitable for forming into a cutting blade for cutting bevel and hypoid gears. The cutting blade being positionable in the blade receiving slot 12 of the cutter head as shown in FIG. 17. The blade blank 74 is preferably made from high speed tool steel, such as M4, and is formed from a predetermined length of bar stock. Blade blank 74 comprises a front surface 76, a back surface 78 and a first side 80 extending between front surface 76 and back surface 78. Although front surface 76 is shown as being parallel to back surface 78, it may extend at a predetermined rake angle along at least a portion of the length thereof as is known to those skilled in the art.

The blade blank 74 further includes a second side comprising a pair of angled portions 82 and 84. Angled portion 82 is oriented at an angle C with respect to front face 76 and angled portion 84 is oriented at an angle D with respect to back surface 78. However, since it is common to have front surface 76 lie at a particular rake angle, angle C is preferably also established with respect to back surface 78. Angled portions 82 and 84 extend toward one another in a converging manner from their respective front and back surfaces. Preferably, the angled portions 82 and 84 intersect with and terminate at end portion 86 which desirably extends generally parallel to first side 80. Angles C and D are each less than 90 degrees and may be different from one another but are preferably the same. It is most preferred that both angles C and D each equal 45 degrees. Of course it is understood that in order for any cutting blade formed from the blade blank 74 to properly fit into and be complementary with the blade receiving slots 12 of a cutter head such as that shown in FIG. 17, angles C and D of angled portions 82 and 84 must equal the respective angles A and B of blade mounting surfaces 62 and 64 (FIG. 18).

Cutting blades for cutting bevel and hypoid gears and formed from blade blanks as seen in FIG. 19 are shown in FIGS. 21–24. FIGS. 21 and 22 illustrate an inside cutting blade 87 for a left-hand (counter clockwise) rotating cutting tool. The cutting blade 87 comprises a front surface 76 oriented at a rake angle K (for example, 12 degrees), a back surface 78, and a side portion 80 extending between front surface 76 and back surface 78. In the cutting blades of FIGS. 21–24, the front surface 76 includes a groove 88 formed therein. Groove 88 is oriented at a rake angle different from angle K and is known from previously mentioned U.S. Pat. No. 4,575,287.

The cutting blade of FIG. 21 further includes a second side comprising angled portions 82 and 84 oriented at respective angles C and D measured with respect to back surface 78 (FIG. 22). The second side also comprises an end portion 86. In forming the cutting blade of FIG. 21, the appropriate end of cutting blade blank 74 is machined to form a front face 76 oriented at a desired rake angle K, groove 88, a cutting profile surface (not shown), clearance profile surface 90 and a tip 92 which is relieved toward the back surface 78 at a relief angle α (20 degrees for example). The intersection of the cutting profile surface with the front surface 76 forms cutting edge 94 while the intersection of the clearance profile surface 90 with front surface 76 forms clearance edge 96. Groove 88 intersects clearance profile surface 90 and forms secondary cutting edge 98.

FIGS. 23 and 24 illustrate an outside cutting blade 89 for a left-hand (counter clockwise) rotating cutting tool. Since cutting blade 89 cuts the opposite tooth flank from that of cutting blade 87, the cutting and clearance profile surfaces are opposite those shown in FIG. 21 and the rake angle K is oriented toward the side opposite that of cutting blade 87. As such, cutting profile surface 100 is noted and its intersection with front surface 76 forms cutting edge 94. As with cutting blade 87, cutting blade 89 includes a second side comprising angled portions 82 and 84 oriented at respective angles C and D measured with respect to back surface 78 (FIG. 24). The second side also comprises an end portion 86. Since front face 76 extends at rake angle K toward the second side of cutting blade 89, an offset 83 is created between the front face 76 and the angled portion 82.

In forming the cutting blade of FIG. 23, the appropriate end of cutting blade blank 74 is machined to form the front face 76 oriented at a desired rake angle K, groove 88, cutting profile surface 100, a clearance profile surface (not shown) and a tip 92 which is relieved toward the back surface 78 at a relief angle α. The intersection of the cutting profile surface 100 with the front surface 76 forms cutting edge 94 while the intersection of the clearance profile surface with front surface 76 forms clearance edge 96. Groove 88 intersects the clearance profile surface and forms secondary cutting edge 98.

It should be noted that while the cross-sectional views shown in FIGS. 22 and 24 have been discussed with respect to the cutting blades FIGS. 21 and 23, it can be appreciated that the same cross-sectional views may also represent the cross-sections of cutting blade blanks comprising a rake angle and groove formed in the front face thereof.

For either cutting blade 87 or 89, the cutting blade is placed in the blade receiving slot 12 of a cutter head, such as that of FIG. 17, and the angled portions 82 and 84 of the cutting blade are positioned against respective blade mounting surfaces 62 and 64 (FIG. 18) by tightening the appropriate screw 38 to push clamping block 36 against side 80 of the cutting blade thereby clamping the cutting blade in the slot 12 of the cutter head 2. Since the angled blade mounting surfaces 62, 64 provide a positive seating surface for the complementary angled surfaces 82, 84 of the cutting blade, the cutting blade is essentially locked in the slot 12. Any tolerance errors between the front or back surfaces 76, 78 of the cutting blade and their respective slot surfaces 66, 68 are eliminated due to the positive seating surfaces 62 and 64.

While the inventive angled blade mounting surfaces have been discussed in combination with the cutter head having dovetail clamping projections, it is to be understood that the angled blade mounting surfaces may be included in other types of cutter heads regardless of the manner in which a cutter head ring portion is attached. In the same manner, the concave-shaped blade clamping block may also find use in other types of cutter heads.

The present cutting tool offers an advance over the prior art cutting tools not only by the inclusion of positive seating surfaces for cutting blades, but also the inventive cutter head requires fewer hours to manufacture. For example, it is possible to finish grind a slot in one operation thus simplifying the manufacturing process. Furthermore, only the angled blade mounting surfaces require fine finishing to exact tolerances since only these surfaces are utilized to position a cutting blade in a cutter head slot. Also, slot depth can easily be changed.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter head portion of a cutting tool for producing toothed articles, said cutter head comprising:
   a cutter body member having an axis of rotation and comprising a first annular outer surface, said first annular outer surface being interrupted by a plurality of inwardly extending blade receiving slots,
   said cutter body member further comprising a second annular outer surface located inward of said first outer annular surface, said second annular outer surface being interrupted by said plurality of inwardly extending blade receiving slots, said first and second annular surfaces being positioned with respect to one another whereby an annular projection is formed effectively protruding from said second annular surface, said annular projection having a predetermined cross-sectional form and being interrupted by said plurality of inwardly extending blade receiving slots thereby defining a plurality of individual projections each having said predetermined cross-sectional form.

2. The cutter head of claim 1 further comprising:
   a clamping ring extending about said cutter body for being secured to said annular projection, said clamping ring having an inner wall positioned adjacent said second annular outer surface, said clamping ring comprising first and second ring members secured together by a plurality of securing means, said first and second ring members defining, when secured together, a receiving channel in said inner wall, said receiving channel having a form complementary with the form of said annular projection whereby securing said first and second ring members together about said annular projection means positions said annular projection in said receiving channel and secures said clamping ring to said cutter body.

3. The cutter head of claim 2 further comprising at least one blade clamping means attached to said receiving channel by an attachment means, said at least one blade clamping means being aligned with a respective at least one of said blade receiving slots for clamping one or more cutting blades in said at least one blade receiving slot, said cutter head including means to urge said clamping means inward in said at least one blade receiving slot to clamp said one or more cutting blades into a desired position.

4. The cutter head of claim 3 wherein said attachment means comprises a form complementary with said form of said receiving channel.

5. The cutter head of claim 3 wherein said blade clamping means comprises a generally concave shape in an unclamped condition.

6. The cutter head of claim 1 wherein said predetermined form of said annular projection comprises a double-dovetail.

7. The cutter head of claim 1 wherein said predetermined form of said annular projection comprises a single-dovetail.

8. The cutter head of claim 1 wherein each of said blade receiving slots comprises opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface.

9. A cutter head portion of a cutting tool for producing toothed workpieces, said cutter head comprising:
   a cutter body member having an axis of rotation and comprising a first annular outer surface, said first annular outer surface being interrupted by a plurality of inwardly extending blade receiving slots,
   said cutter body member further comprising a second annular outer surface located inward of said first outer annular surface, said second annular outer surface being interrupted by said plurality of inwardly extending blade receiving slots, said first and second annular surfaces being positioned with respect to one another whereby an annular projection is formed effectively protruding from said second annular surface, said annular projection having a predetermined cross-sectional form and being interrupted by said plurality of inwardly extending blade receiving slots thereby defining a plurality of individual projections each having said predetermined cross-sectional form,
   said blade receiving slots each comprising opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface.

10. The cutter head of claim 9 further including:
    a clamping ring extending about said cutter body for being secured to said annular projection, said clamping ring having an inner wall positioned adjacent said second annular outer surface, said clamping ring comprising first and second ring members secured together by a plurality of securing means, said first and second ring members defining, when secured together, a receiving channel in said inner wall, and said receiving channel having a form complementary with the form of said annular projection whereby securing said first and second ring members together about said annular projection positions said annular projection in said receiving channel and secures said clamping ring to said cutter body.

11. A cutter head portion of a cutting tool for producing toothed workpieces, said cutter head comprising:

a cutter body member having an axis of rotation and a plurality of blade receiving slots, said blade receiving slots each comprising opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface.

12. The cutter head of claim 11 wherein said angle of each of said angled mounting surfaces is equal to 45 degrees.

13. The cutter head of claim 11 wherein said inner end portion further includes an end surface extending between said first and second angled mounting surfaces.

14. A clamping ring for extending about a cutter head portion of a cutting tool and for being secured to an annular projection on said cutter head portion, said clamping ring comprising:

an inner wall positionable adjacent an inner annular surface on said cutter head portion, first and second ring members securable together by a plurality of securing means, said first and second ring members defining, when secured together, a receiving channel in said inner wall, said receiving channel having a form complementary with the form of said annular projection on said cutter head portion whereby securing said first and second ring members together about said annular projection means positions said annular projection in said receiving channel and secures said clamping ring to said cutter head portion.

15. A cutting tool for producing toothed workpieces, said cutting tool comprising:

a cutter body member having an axis of rotation and comprising a first annular outer surface, said first annular outer surface being interrupted by a plurality of inwardly extending blade receiving slots, said cutter body member further comprising a second annular outer surface located inward of said first outer annular surface, said second annular outer surface being interrupted by said plurality of inwardly extending blade receiving slots, said first and second annular surfaces being positioned with respect to one another whereby an annular projection is formed effectively protruding from said second annular surface, said annular projection having a predetermined cross-sectional form and being interrupted by said plurality of inwardly extending blade receiving slots thereby defining a plurality of individual projections each having said predetermined cross-sectional form, a clamping ring extending about said cutter body and secured to said annular projection, said clamping ring having an inner wall positioned adjacent said second annular outer surface, said clamping ring comprising first and second ring members secured together by a plurality of securing means, said first and second ring members defining a receiving channel in said inner wall, and said receiving channel having a form complementary with the form of said annular projection whereby securing said first and second ring members together about said annular projection means positions said annular projection in said receiving channel and secures said clamping ring to said cutter body, at least one cutting blade positioned in at least one of said blade receiving slots.

16. The cutting tool of claim 15 wherein each of said blade receiving slots comprises opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface.

17. A cutting tool for producing toothed workpieces, said cutting tool comprising:

a cutter body member having an axis of rotation and comprising a first annular outer surface, said first annular outer surface being interrupted by a plurality of inwardly extending blade receiving slots, said cutter body member further comprising a second annular outer surface located inward of said first outer annular surface, said second annular outer surface being interrupted by said plurality of inwardly extending blade receiving slots, said first and second annular surfaces being positioned with respect to one another whereby an annular projection is formed effectively protruding from said second annular surface, said annular projection having a predetermined cross-sectional form and being interrupted by said plurality of inwardly extending blade receiving slots thereby defining a plurality of individual projections each having said predetermined cross-sectional form, a clamping ring extending about said cutter body and secured to said annular projection, said clamping ring having an inner wall positioned adjacent said second annular outer surface, said clamping ring comprising first and second ring members secured together by a plurality of securing means, said first and second ring members defining a receiving channel in said inner wall, and said receiving channel having a form complementary with the form of said annular projection whereby securing said first and second ring members together about said annular projection means positions said annular projection in said receiving channel and secures said clamping ring to said cutter body, said blade receiving slots each comprising opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface, at least one cutting blade positioned in at least one of said blade receiving slots, said at least one cutting blade having a side surface a portion of which is of a shape complementary to that of said angled mounting surfaces.

18. A cutting tool for producing toothed workpieces, said cutting tool comprising:

a cutter body member having an axis of rotation and a plurality of blade receiving slots, said blade receiving slots each comprising opposing first and second side surfaces and an inner end portion with said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface, at least one cutting blade positioned in at least one of said blade receiving slots, said at least one cutting blade having a side surface a portion of which is of a shape complementary to that of said angled mounting surfaces.

* * * * *